United States Patent [19]
Fujiu et al.

[11] Patent Number: 5,615,916
[45] Date of Patent: Apr. 1, 1997

[54] SHOCK ABSORBING APPARATUS FOR STEERING COLUMN

[75] Inventors: Isao Fujiu; Mitsuo Yabutsuka, both of Kiryu, Japan

[73] Assignee: Kabushiki Kaisha Yamada Seisakusho, Gunma-ken, Japan

[21] Appl. No.: 493,072

[22] Filed: Jun. 21, 1995

[30] Foreign Application Priority Data

Aug. 10, 1994 [JP] Japan ................................. 6-208208

[51] Int. Cl.⁶ ................................................ B62D 1/19
[52] U.S. Cl. ............................ 280/777; 188/374; 74/492
[58] Field of Search ................................. 280/777, 775, 280/779, 780; 188/371, 374, 375, 376, 377; 74/492, 493

[56] References Cited

U.S. PATENT DOCUMENTS

| 5,425,553 | 6/1995 | Yazane et al. | 280/777 |
| 5,452,917 | 9/1995 | Fujiu et al. | 280/777 |

FOREIGN PATENT DOCUMENTS

| 3-136972 | 6/1991 | Japan | 280/777 |
| 6-56041 | 3/1994 | Japan . | |
| 6-286624 | 10/1994 | Japan . | |

*Primary Examiner*—Brian L. Johnson
*Assistant Examiner*—Peter C. English
*Attorney, Agent, or Firm*—Lowe, Price, LeBlanc & Becker

[57] ABSTRACT

A shock absorbing apparatus for a steering column includes an energy absorbing member which is immovably fixed to a vehicle body and a bracket adapted to move together with the steering column with respect to the energy absorbing member. The bracket is provided with a horizontally crushing through-hole portion, while the energy absorbing member is provided with a pair of crushable abutment portions formed respectively on opposite sides of a flat plate-like main portion. The energy absorbing member is disposed by being passed through the horizontally crushing through-hole portion, and both sides of the horizontally crushing through-hole portion normally abut against the crushable abutment portions.

8 Claims, 10 Drawing Sheets

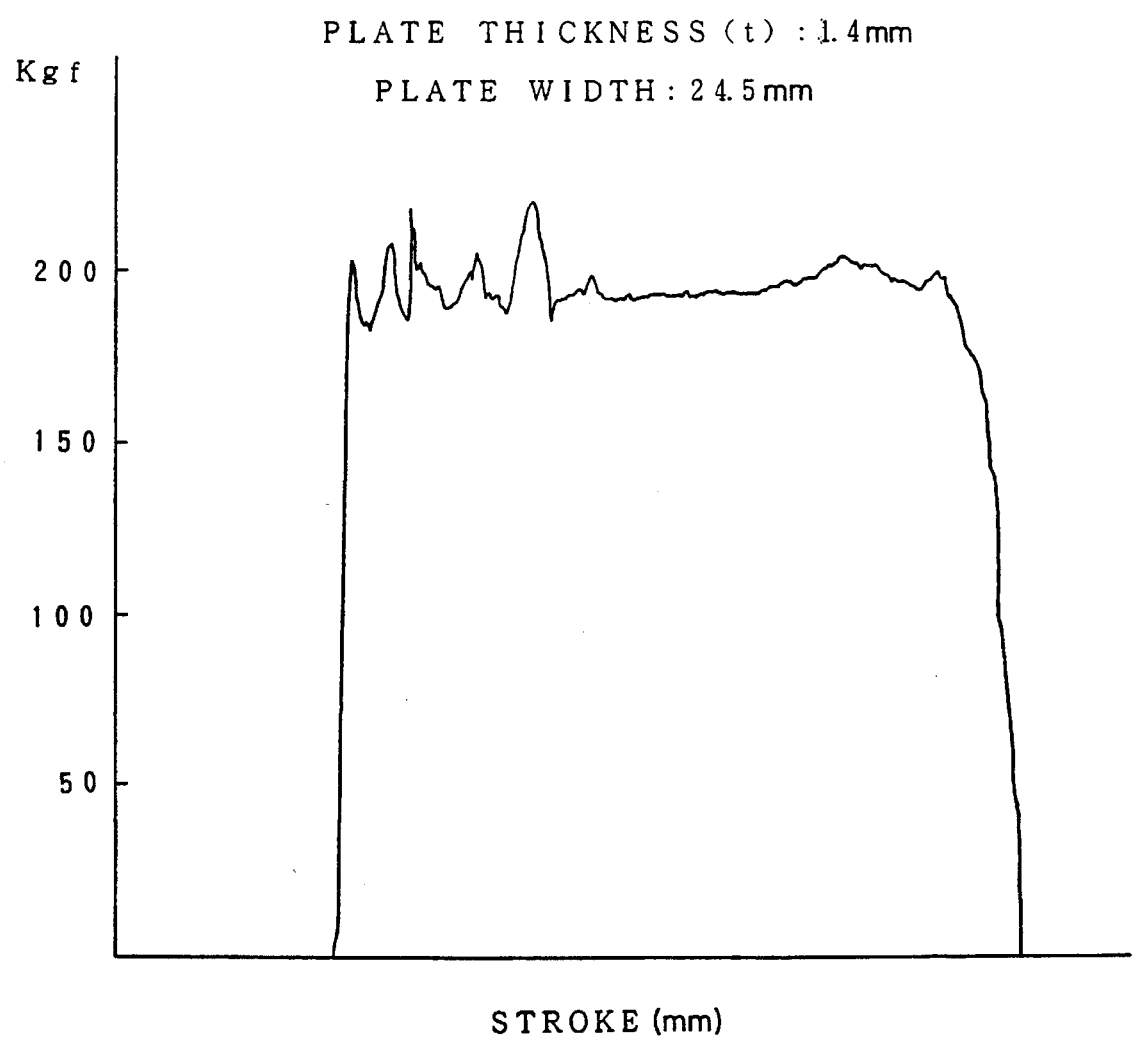

SHOCK ABSORBING APPARATUS FOR STEERING COLUMN

BACKGROUND OF THE INVENTION

1. Field of the Invention

The present invention relates to a shock absorbing apparatus for a steering column in which an energy absorbing structure for damping a shock when a driver hits against a steering wheel during an emergency such as a collision can be made into a very simple structure, and which is capable of operating satisfactorily.

2. Description of the Related Art

As an apparatus for absorbing a shock during a collision of a vehicle so as to protect the driver from the shock, a carling type is conventionally widely used. For example, a shock apparatus for a steering column which has a very simple structure has been proposed in Japanese Patent Application Laid-Open No. 56041/1994. In addition, in Japanese Patent Application Laid-Open No. 93820/1993, there has also been proposed an apparatus which expands the variation of a load characteristic without substantially changing its structure by appropriately selecting an energy absorbing state during a collision.

In the above-described two shock absorbing apparatuses for a steering column, a protruding rib arranged in the longitudinal direction of the energy absorbing member is crushed by a through hole portion formed in the bracket which moves together with the steering column. In the case of such a structure, upper and lower portions of the through hole portion of the bracket serve to absorb an impact load by directly pressing and crushing the protruding rib of the energy absorbing member, while the left- and right-hand portions of the through hole portion serve to allow the bracket, which moves with the steering column, to move along the longitudinal direction of the energy absorbing member, or to directly deform the energy absorbing member. Accordingly, it is necessary to set the dimensional accuracy of both the vertical and horizontal dimensions of the through hole to high levels.

In addition, with the structure for damping the impact in the above-described steering apparatus, since the load varies depending on a dimensional change, strict dimensional accuracy is required in machining, so that machining efficiency deteriorates. Therefore, there is a drawback in that it is difficult to easily expand the variation of the load characteristic.

SUMMARY OF THE INVENTION

Accordingly, an object of the present invention is to provide a shock absorbing apparatus for a steering column which is capable of overcoming the above-described drawbacks of the conventional art.

To this end, in accordance with the present invention, there is provided a shock absorbing apparatus for a steering column for absorbing a shock applied to the steering column, comprising: an energy absorbing member which is immovably fixed to a vehicle body; and a bracket mounted on the energy absorbing member and adapted to move relatively together with the steering column with respect to the energy absorbing member so as to absorb the shock, wherein the bracket is provided with a horizontally crushing through-hole portion, the energy absorbing member is provided with a flat plate-like main portion and a pair of crushable abutment portions formed respectively on opposite sides of the flat plate-like main portion, the energy absorbing member is disposed by being passed through the horizontally crushing through-hole portion, and both sides of the horizontally crushing through-hole portion normally abut against the crushable abutment portions.

In accordance with the apparatus of the present invention, during a collision, the bracket moves together with the steering column, with the result that the horizontally crushing through-hole portion moves in such a manner as to squeeze (transversely reduce) the crushable abutment portions formed on both sides of the flat main portion of the fixed energy absorbing member. At this time, the bracket moves while the crushable abutment portions of the energy absorbing member are deformed and bent by the side portions of the horizontally crushing through-hole portion. A deforming load is thus produced, and the shock applied to the steering column can be thereby absorbed.

BRIEF DESCRIPTION OF THE DRAWINGS

FIG. 11 is a graph illustrating the performance in accordance with an embodiment of the present invention.

DESCRIPTION OF THE PREFERRED EMBODIMENT

Hereafter, a description will be given of an embodiment of the present invention with reference to the accompanying drawings.

Figure 1:
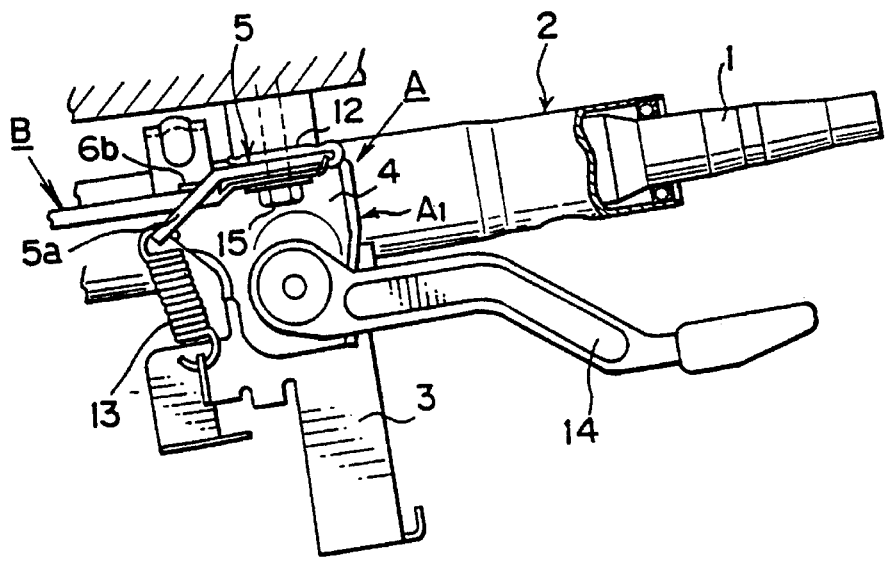
FIG. 1 is a side elevational view of an essential portion of a steering apparatus to which the present invention is applied.
Figure 2:
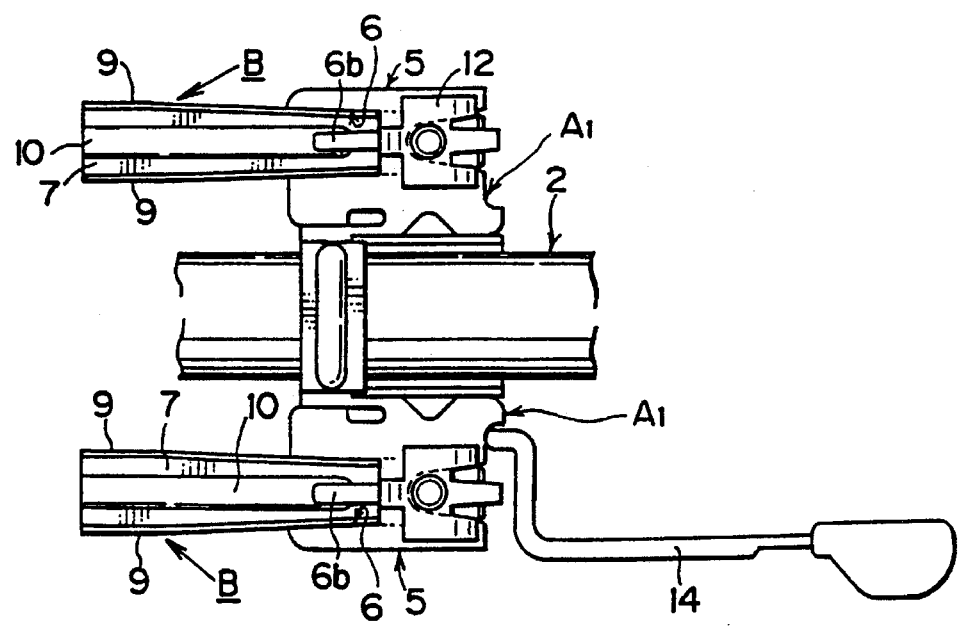
FIG. 2 is a plan view illustrating an essential portion in accordance with the present invention.
Figure 3:
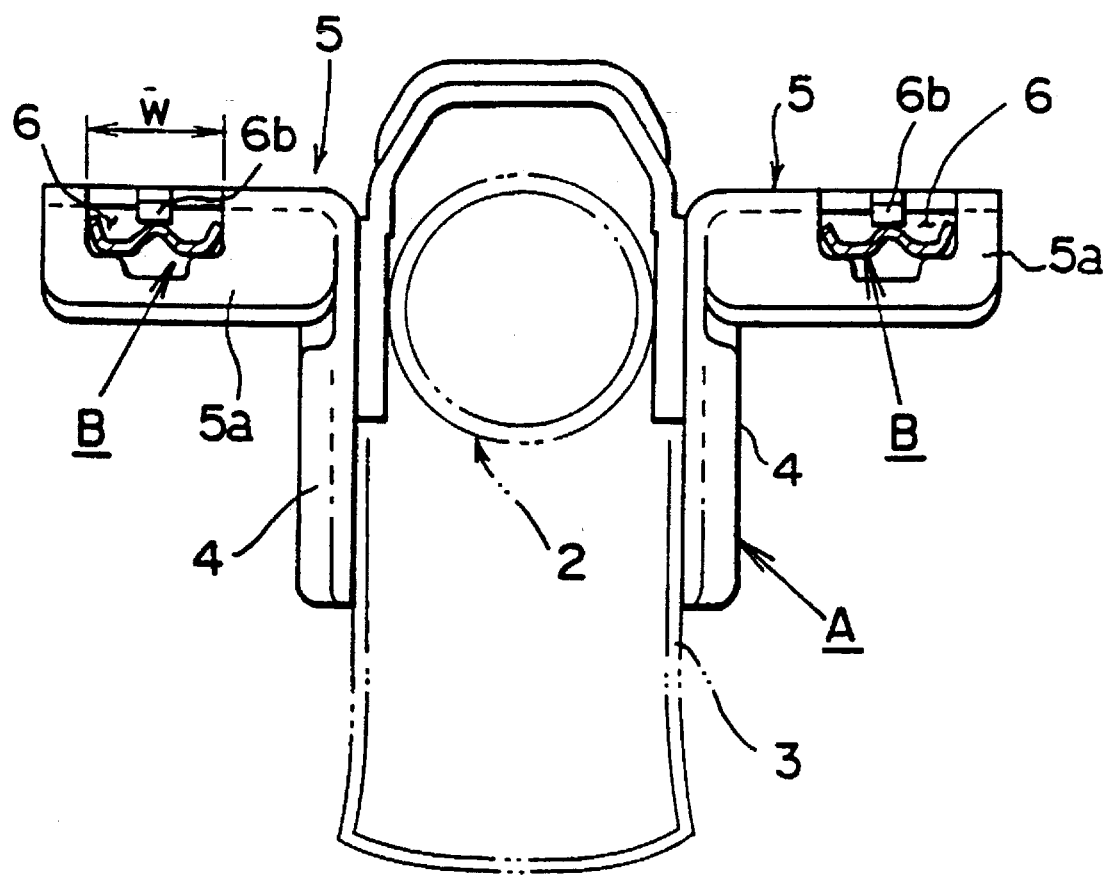
FIG. 3 is a schematic front elevational view illustrating the essential portion in accordance with the present invention.

As shown in FIG. 1, a steering shaft 1 is fitted in a steering column 2. As shown in FIGS. 2 and 3, a bracket A is arranged to support the steering column 2, and in this embodiment the bracket A is comprised of a lifting/lowering bracket 3 for lifting or lowering the steering column 2 and a fixing bracket $A_1$ for fixing the steering column 2 at a predetermined position. The lifting/lowering bracket 3 is raised or lowered with respect to the fixing bracket $A_1$ so as to set the steering shaft 1 to an appropriate position.

The fixing bracket $A_1$ of the bracket A has a pair of mounting and fixing portions 5 formed in such a manner as to extend outwardly from upper ends of a pair of supporting side portions 4, respectively. Both mounting and fixing portions 5 are provided with identical shapes which are laterally symmetrical with each other. As shown in FIGS. 1 and 3, each of the mounting and fixing portions 5 has an inclined surface 5a formed in such a manner as to be inclined from its end (a left-hand end of the mounting and fixing portion 5 in FIG. 1), and this inclined surface 5a serves as an end of each mounting and fixing portion 5.

Figure 4:
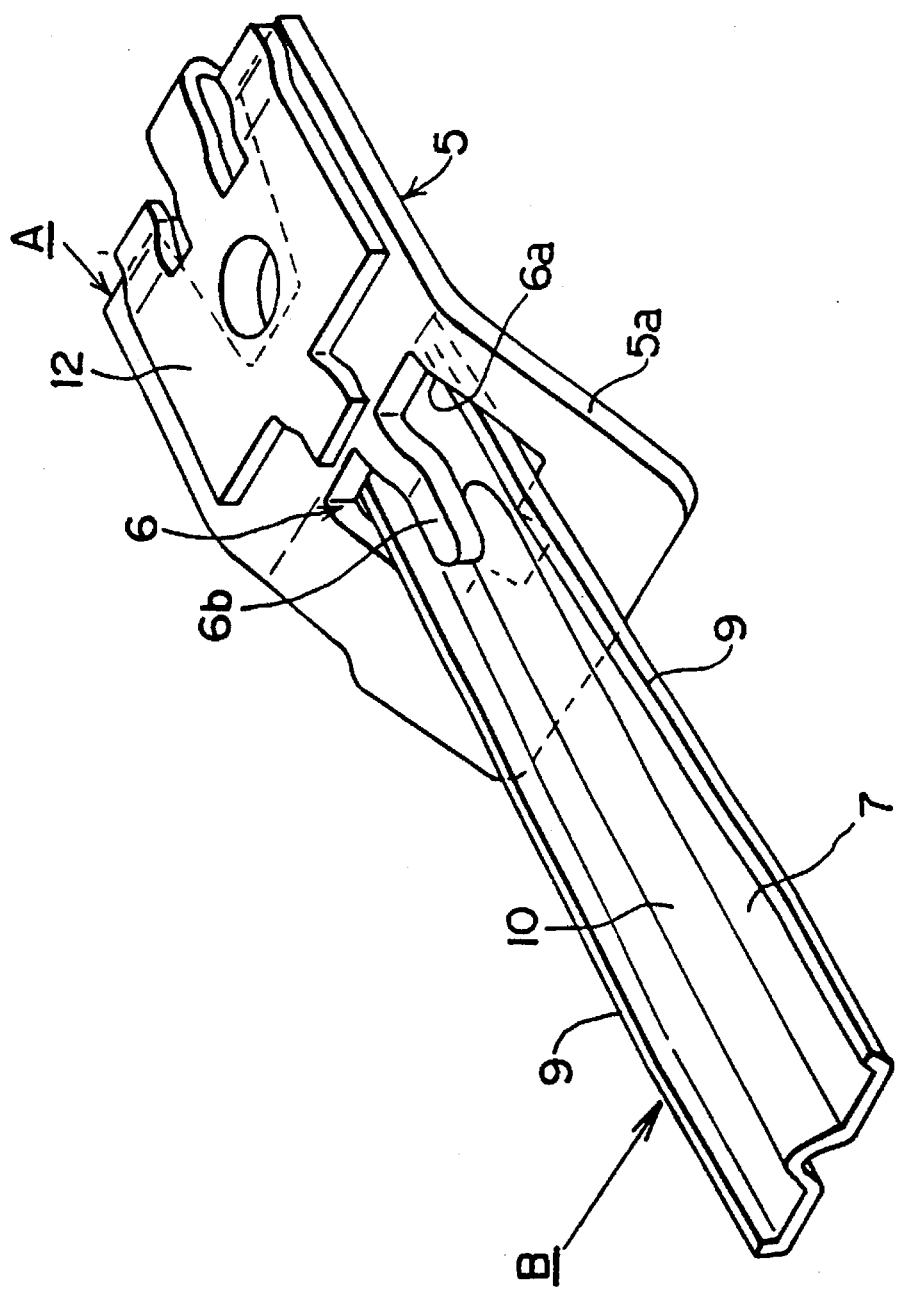
FIG. 4 is a perspective view of the essential portion in accordance with the present invention.

A horizontally crushing through-hole portion 6 is formed in the inclined surface 5a, and is comprised of a horizontally crushing through hole 6a and a supporting piece 6b, as shown in FIGS. 3 and 4. As shown in FIGS. 3, 4 and the like, the horizontally crushing through hole 6a is formed in a substantially rectangular shape, and has a width W. The supporting piece 6b is formed in such a manner as to project substantially horizontally above the horizontally crushing through hole 6a. The supporting piece 6b is formed in such a manner as to support a supported protruding rib 10 of one of a pair of energy absorbing members B, which will be described later, from above or below. In addition, a mounting and fixing member 12, which will be described later, is fixed in such a manner as to clamp one end of each of the mounting and fixing portions 5.

As shown in FIG. 1, a restoring member 13 is fitted to the bracket A. Specifically, the restoring member 13 has the shape of a coil spring, and is disposed between the fixing bracket $A_1$ and the lifting/lowering bracket 3. In practice, the restoring member 13 is fitted between a lower end of the inclined surface 5a and the lifting/lowering bracket 3.

The energy absorbing member B is comprised of the following members: an elongated flat main portion 7; a plate-like flat mounting portion 8 continuing from a longitudinal end of the main portion 7; a pair of crushable abutment portions 9 which are located on transverse sides of the main portion 7; and the supported protruding rib 10 which is provided as required. As the energy absorbing member B, it is possible to adopt various forms of examples. Specifically, as shown in FIGS. 5(a) to 5(c) and 6(a) to 6(e), the flat mounting portion 8 is formed at a longitudinal end of the elongated flat main portion 7, which is made of a metal strip, via a stepped portion. The pair of crushable abutment portions 9 are formed on both sides of the main portion 7, and the abutment portions 9 are formed in such a manner as to be upwardly inclined outwardly from the transverse sides. The angle of their inclination is preferably about 15 to 30 degrees or thereabouts with respect to a vertical line, more preferably about 20 degrees.

The supported protruding rib 10 having a compressed arcuate cross section is formed on the main portion 7 on its free end side away from the flat mounting portion 8 by means of press working or the like. If it is assumed that the height of the supported protruding rib 10 is $H_n$, and that the height of the crushable abutment portion 9 is $H_o$, there is a case where $H_n > H_o$ [see FIG. 6(d)], and there is a case where $H_n < H_o$ [see FIG. 6(e)]. In addition, the angle α of the supported protruding rib 10 is appropriately selected depending on the height $H_n$, and is set preferably in the vicinity of 90°[see FIG. 7(c)].

In addition, when the energy absorbing member B is viewed in a plan view, the width of the main portion 7 is formed in such a manner as to be gradually wider from the flat mounting portion 8 side toward the free end side. A fixing hole 8a in which a fitting 15 such as a bolt is passed through is formed in the flat mounting portion 8, so that the energy absorbing member B can be mounted in the vehicle body in an immovable state by means of the fitting 15.

As for the energy absorbing member B, there are a plurality of examples in the way it is formed with its width increasing gradually from the proximal end side thereof (the flat mounting portion 8 side) toward the free end side (the side away from the flat mounting portion 8 side). This arrangement is provided to reduce the impact abruptly, and as its typical example the width is formed in such a manner as to be gradually wider in an oppositely tapered form, as shown in FIG. 5(c).

Figure 5:
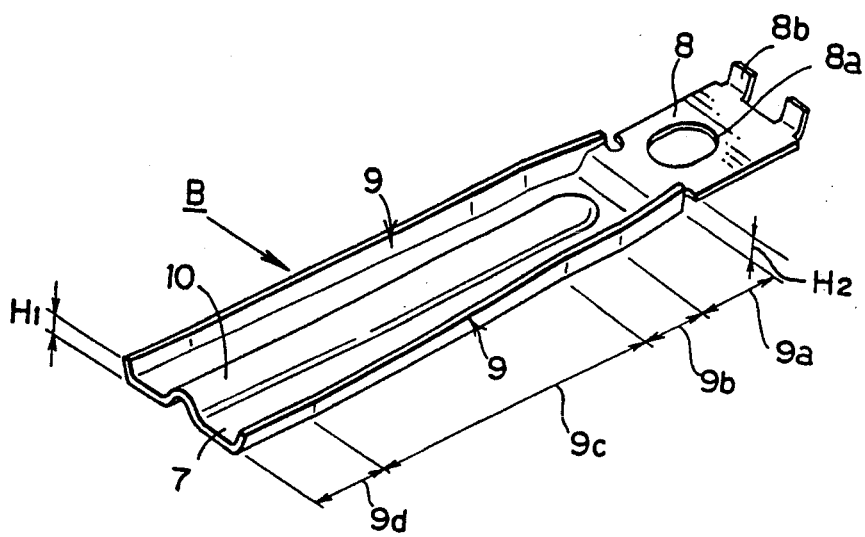
FIGS. 5(a), 5(b), and 5(c) are perspective views of examples of an energy absorbing member, respectively.
Figure 5:
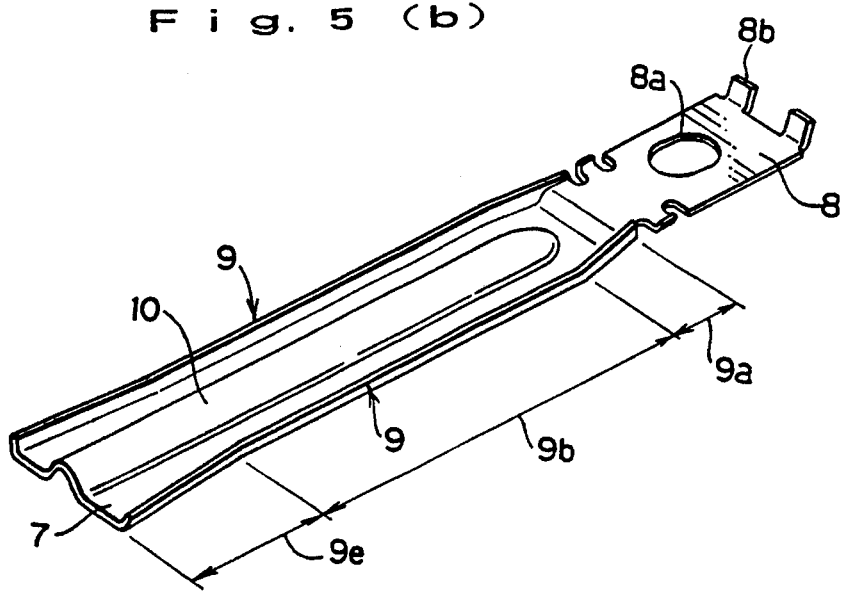
Figure 5:
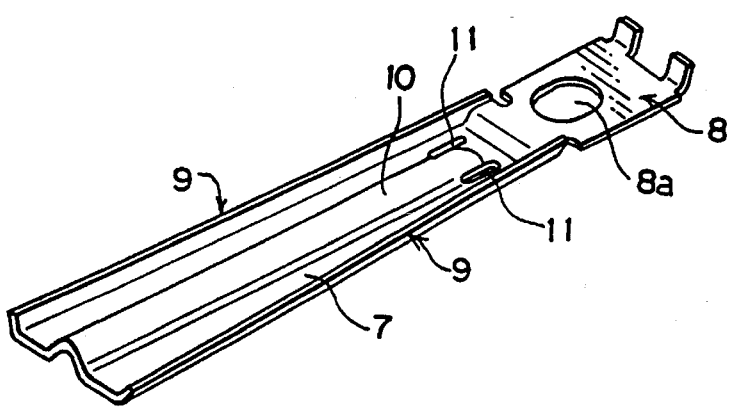

In another example of the energy absorbing member B formed in such a manner as to be gradually wider, as shown in FIG. 5(a), the abutment portions 9 of the energy absorbing member B include a pair of proximal-side inclined abutment portions 9a with an interval therebetween gradually widening from the proximal side of the energy absorbing member B toward the free end side thereof, a pair of intermediate abutment portions 9b with a uniform interval therebetween, a pair of intermediate inclined abutment portions 9c with an interval therebetween gradually widening in their intermediate portions, and a pair of free-end abutment portions 9d with a uniform interval therebetween on the free end side.

In still another example, as shown in FIG. 5(b), the abutment portions 9 of the energy absorbing member B include the pair of proximal-side inclined abutment portions 9a with an interval therebetween gradually widening from the proximal side toward the free end side, a pair of intermediate abutment portions 9b having a uniform interval therebetween and a relatively large length, and a pair of free-end inclined abutment portions 9e with an interval therebetween gradually widening on the free end side.

Figure 6:
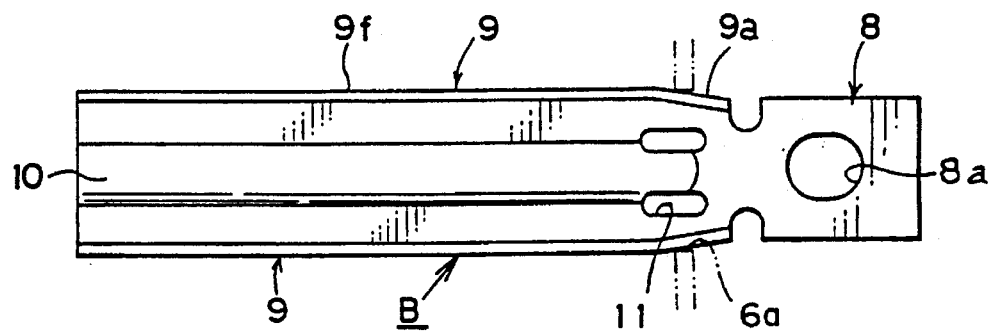
FIGS. 6(a) and 6(b) are perspective views of other examples of an energy absorbing member.
FIG. 6(c) is a perspective view illustrating an essential portion of a modification of the mounting flat portion side of the energy absorbing member.
FIGS. 6(d) and 6(e) are cross-sectional views of further examples of the energy absorbing member, respectively.
Figure 6:
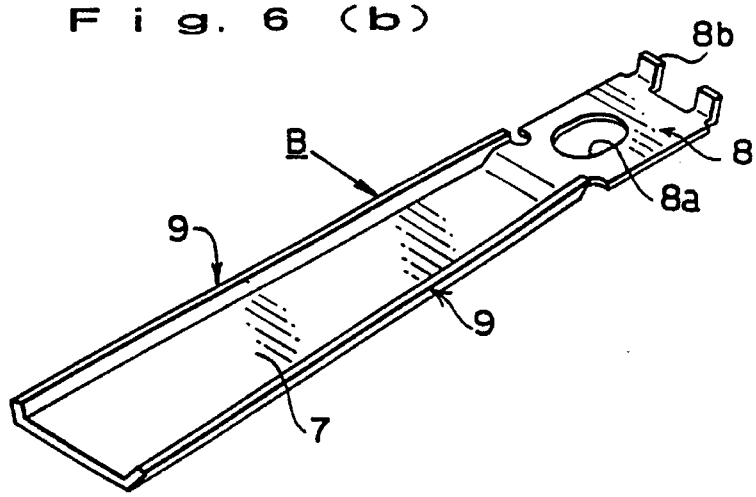
Figure 6:
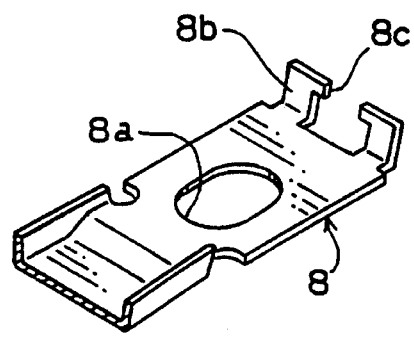
Figure 6:
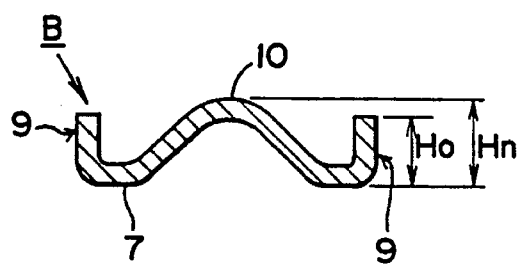
Figure 6:
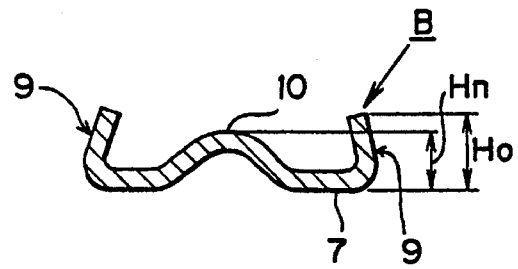

In a further example, as shown in FIG. 6(a), the abutment portions 9 of the energy absorbing member B may include the pair of proximal-side inclined abutment portions 9a with an interval therebetween gradually widening from the proximal side toward the free end side and a pair of abutment portions 9f with a uniform interval therebetween.

In addition, as shown in FIG. 6(b), the energy absorbing member B may be comprised of the main portion 7, the flat mounting portion 8, and the pair of crushable abutment portions 9, without providing the supported protruding rib 10.

Furthermore, as shown in FIG. 6(d), in the cross-sectional view of the energy absorbing member B, the crushable abutment portions 9 may be formed vertically, or, as shown in FIG. 6(e), the crushable abutment portions 9 may be oriented upwardly and slightly or sharply inclined inwardly. In addition, the crushable abutment portions 9 may be formed such that their height $H_2$ on the proximal side is set to be greater than their height $H_1$ on the free end side, as shown in FIG. 5(a), or these heights may be set to be identical.

Each energy absorbing member B is passed through the horizontally crushing through hole 6a of the horizontally crushing through-hole portion 6 formed in the inclined surface 5a of the bracket A. The arrangement provided is such that the energy absorbing member B is secured to the vehicle body at the fixing hole 8a of the flat mounting portion 8 immovably together with the mounting and fixing member 12, and the main portion 7 and the pair of crushable abutment portions 9 project outside the mounting and fixing portion 5 through the horizontally crushing through hole 6a of the horizontally crushing through-hole portion 6. At this time, mounting is effected such that the supporting piece 6b abuts against a top portion of the supported protruding rib 10, and respective outer side walls of the crushable abutment portions 9 on the proximal side (the flat mounting portion 8 side) are set in such a manner as to abut against both side walls of the horizontally crushing through hole 6a of the horizontally crushing through-hole portion 6.

In a specific example, the setting provided is such that the outer side walls of the proximal-side inclined abutment portions 9a or the intermediate abutment portions 9b of the crushable abutment portions abut against both side walls of the horizontally crushing through hole 6a of the horizontally crushing through-hole portion 6. Hence, in the event that an impact load has acted, both side walls of the horizontally crushing through hole 6a act in such a manner as to immediately squeeze (transversely reduce) the crushable abutment portions 9 on both sides of the energy absorbing member B.

Each of the mounting and fixing members 12 has a cross-sectional shape of a hair pin, and is fixed in such a manner as to clamp a rear-end portion of each of the pair of mounting and fixing portions 5 of the bracket A. The arrangement provided is such that when an external force has acted during a collision, the mounting and fixing portions 5 of the bracket A are disengaged from the mounting and fixing members 12 to cancel their clamped state, and slide forward (leftward in FIGS. 1 and 2). Incidentally, as shown in FIGS. 5(a) to 5(c), a pair of retaining projections 8b formed on the flat mounting portion 8 are made capable of engaging a rear end of the mounting and fixing member 12 on transverse sides thereof. The presence of these retaining projections 8b make it possible to allow the energy absorbing member B to be prevented from coming off or to be held stably. As a modification of these retaining projections 8b, as shown in FIG. 6(c), hooks 8c may be provided on the retaining projections 8b, respectively, in face-to-face relation to each other, thereby further stabilizing the prevention of the coming off of the energy absorbing member B.

As the operator operates an operation lever 14 appropriately by means of the lifting/lowering bracket 3 of the bracket A, the operator is able to set the steering column 2 at an appropriate position.

In the present invention, in the operating state during the absorption of a shock, when the vehicle body has collided, the driver hits against the steering wheel, and the shock is transmitted to the steering shaft 1 and the steering column 2 via the steering wheel. Thereupon, the bracket A is offset and moves in the forward direction of the vehicle body (leftward in FIGS. 8 and 9), as shown in FIGS. 8(a), 8(b), 9(a), and 9(b).

Figure 7:
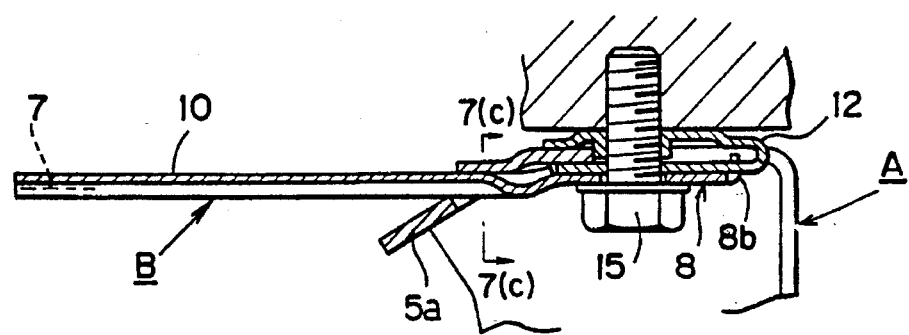
FIG. 7(a) is a cross-sectional view of the essential portion in accordance with the present invention.
FIG. 7(b) is a plan view of FIG. 7(a)
FIG. 7(c) is a cross-sectional view taken in the direction of arrows along line 7(c)–7(c) in FIG. 7(a)
Figure 7:
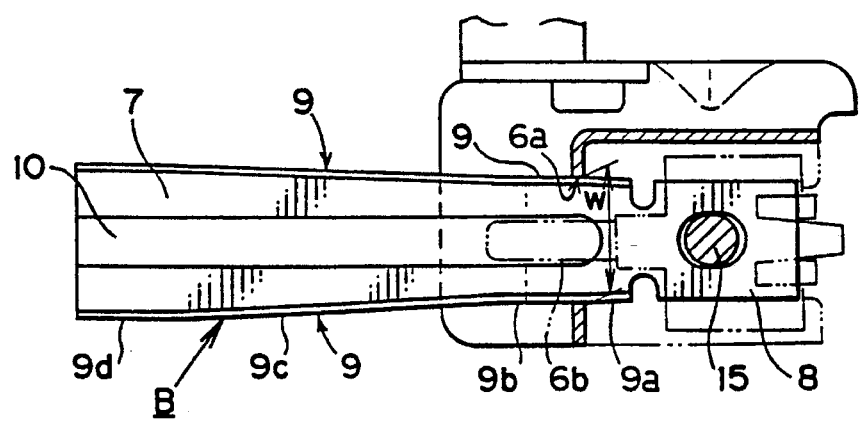
Figure 7:
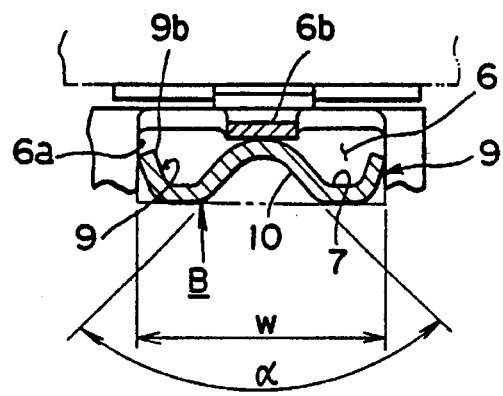
Figure 8:
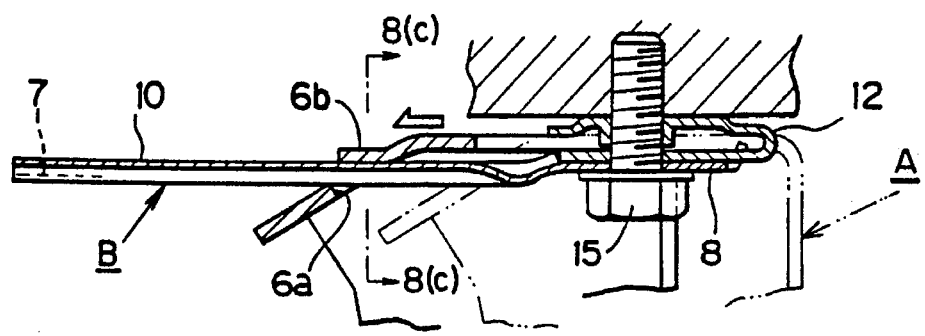
FIG. 8(a) is a cross-sectional view of the essential portion in accordance with the present invention.
FIG. 8(b) is a plan view of FIG. 8(a)
FIG. 8(c) is a cross-sectional view taken in the direction of arrows along line 8(c)–8(c) in FIG. 8(a)
Figure 8:
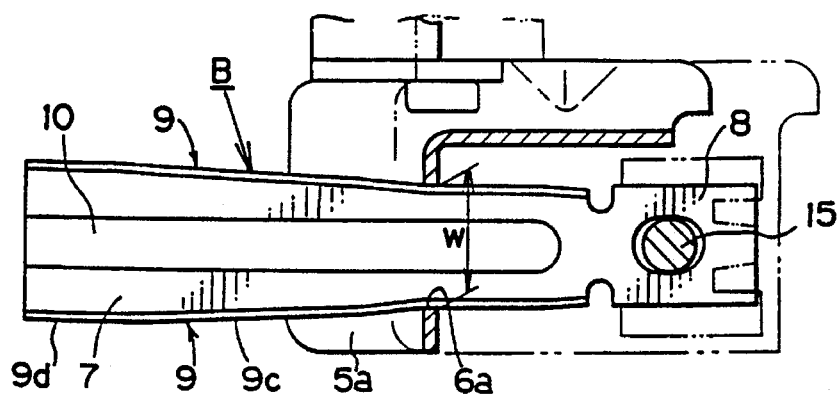
Figure 8:
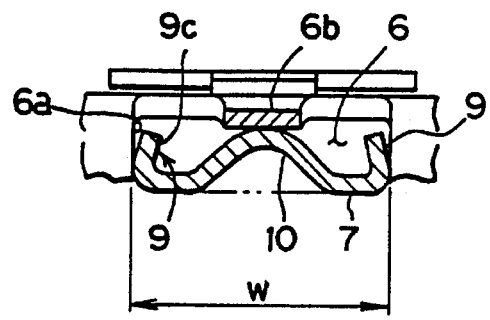
Figure 9:
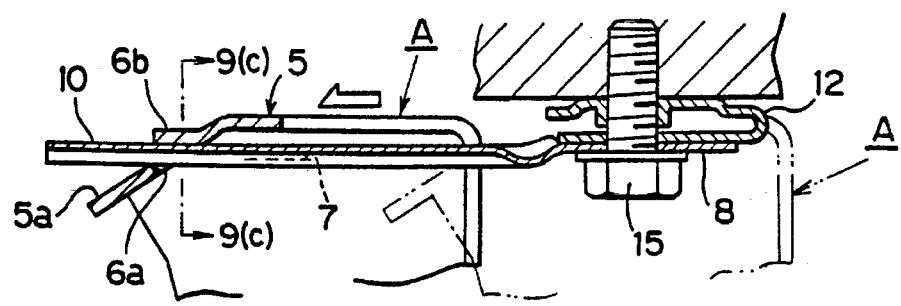
FIG. 9(a) is a cross-sectional view of the essential portion in accordance with the present invention.
FIG. 9(b) is a plan view of FIG. 9(a)
FIG. 9(c) is a cross-sectional view taken in the direction of arrows along line 9(c)–9(c) in FIG. 9(a)
Figure 9:
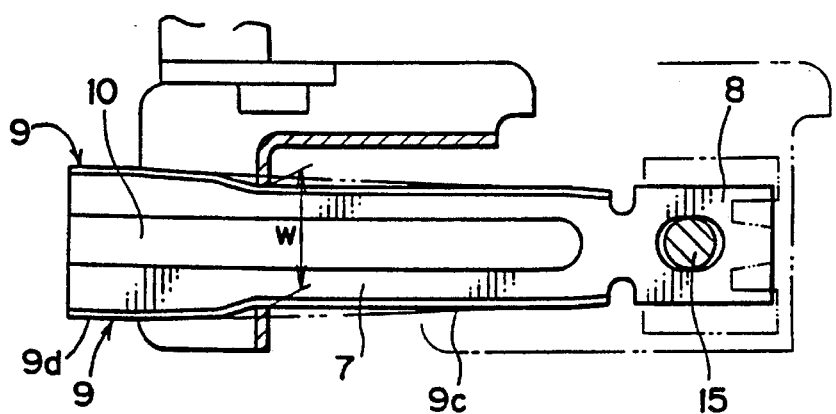
Figure 9:
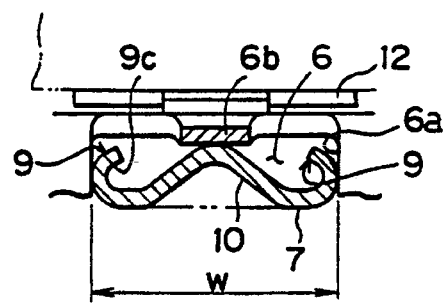

At this time, the mounting and fixing members 12 and the energy absorbing member B are fixed immovably with respect to the vehicle body, so that the energy absorbing member B does not move even if the bracket A has moved together with the steering column 2. First, prior to the occurrence of the shock, as shown in FIGS. 4, 7(a), and 7(b), each horizontally crushing through-hole portion 6 of the bracket A is in a state of being fixed relative to the main portion 7. During the occurrence of the shock, however, as shown in FIGS. 8(a), 8(b), 9(a), and 9(b), the bracket A moves in the forward direction of the vehicle body, and moves while crushing the crushable abutment portions 9 of the energy absorbing member B at both side wall portions of the horizontally crushing through-hole portion 6 [see FIGS. 8(c) and 9(c)]. In this case, since the supported protruding rib 10 of the energy absorbing member B is supported from above or below by means of the supporting piece 6b, the supporting piece 6b slides along the supported protruding rib 10 of the energy absorbing member B.

As the horizontally crushing through-hole portion 6 of the bracket A moves in the forward direction of the vehicle body while crushing the crushable abutment portions 9 of the energy absorbing member B, the shock received by the bracket A via the steering wheel is absorbed, thereby making it possible to alleviate the shock occurring when the driver hits against the steering wheel.

As described above, the effectiveness of the shock absorption can be adjusted by appropriately setting the degree of taper in a plan view of the crushable abutment portions 9 as well as the longitudinal length thereof.

The supporting piece 6b formed above the horizontally crushing through hole 6a of the horizontally crushing through-hole portion 6 presses and supports the supported protruding rib 10 of the energy absorbing member B to the region of the horizontally crushing through hole 6a. Consequently, the supporting piece 6b can serve as a fulcrum when the crushable abutment portions 9 are crushed in a bent state, and when the energy absorbing member B is assembled to the bracket A, the supporting piece 6b can set the energy absorbing member B in a very stable, tentatively fixed state. In addition, weakened portions 11 are formed, as required, at the position where the crushing begins, i.e., at the position of abutment of the main portion 7 [see FIG. 5(c)]. If the weakened portions 11 are formed, it is possible to alleviate the impact at the time when the crushing begins.

In the present invention, as described above, the shock absorbing apparatus for a steering column is arranged as follows: The horizontally crushing through-hole portion 6 is formed in the bracket A which moves together with the steering column 2, the energy absorbing member B in which the pair of crushable abutment portions 9 are formed on both sides of the flat main portion 7 is fixed to the vehicle body, the energy absorbing member B is disposed by being passed through the horizontally crushing through-hole portion 6, and both sides of the horizontally crushing through-hole portion 6 normally abuts against the crushable abutment portions 9. Accordingly, various advantages can be obtained in that the state of shock absorption can be made stable, and it is possible to provide a shock absorbing apparatus for a steering column having a simple structure at low cost.

To give a more detailed description of the above-described advantages, both sides of the horizontally crushing through-hole portion 6 normally abuts against the crushable abutment portions 9. During the occurrence of a shock, the bracket A moves, with the result that squeezing action or compressing action takes place in the energy absorbing member B in which the crushable abutment portions 9 formed on both sides of the main portion 7 of the energy absorbing member B are squeezed or compressed in the widthwise direction by the side walls of the horizontally crushing through-hole portion 6. Consequently, the impact load can be dampened. Namely, in terms of the cross section of the energy absorbing member B, since the crushable abutment portions 9 are located on both side ends, both crushable abutment portions 9 in a cantilevered state are crushed or bent by both side walls of the horizontally crushing through-hole portion 6. Hence, there is an advantage in that the above-described action of widthwise squeezing or bending the crushable abutment portions 9 can be accomplished relatively easily.

To describe this aspect further, in the conventional shock absorbing apparatus for a steering column, a supported protruding rib located in a transversely intermediate position of a main plate is bent in a vertical direction. In such a case, if the supported protruding rib is considered as a beam, the supported protruding rib is in the state of a fixed beam or a beam supported at both ends, so that it is a minimum requirement to flatten the supported protruding rib in such a manner as to widen it toward both sides. Consequently, a large force has been conventionally required. In the present invention, however, since the arrangement provided is such that both sides are bent, the bending portion is in the cantilevered state, so that there is an advantage in that the supported protruding rib can be bent quite easily.

In addition, in the present invention, in terms of the cross section of the energy absorbing member B, since the crushable abutment portions 9 are formed on both sides, and these crushable abutment portions 9 are bent, equal forces act on both sides in terms of a cross-sectional view. Hence, a stable force can be applied. Namely, in the present invention, there are a total of four damping portions on the respective both sides of the horizontally crushing through-hole portions 6. Accordingly, it is possible to provide an excellent damping apparatus exhibiting high stability on both sides.

Next, as the bracket A moves, each horizontally crushing through-hole portion 6 moves together with the bracket A, and absorbs the energy of the shock while crushing the crushable abutment portions 9 on both sides of the energy absorbing member B. Since the structure is simple, the action of absorbing the impact energy takes place reliably.

In addition, in the present invention, since each of the crushable abutment portions 9 of the energy absorbing member B is provided with a fixed cross-sectional configuration in the longitudinal direction, it is possible to constantly make substantially uniform the crushing force by which the crushable abutment portions 9 are crushed by the horizontally crushing through-hole portion 6. Hence, the state of absorbing the energy of the shock can be made very smooth. As is apparent from the graph shown in FIG. 11 illustrating the performance in accordance with an embodiment of the present invention, even if the crushed state of the crushable abutment portions 9 advances, the acting load is substantially uniform.

In addition, since this shock absorbing apparatus for a steering column is arranged such that the main portion 7 of the energy absorbing member B is formed in such a manner as to be gradually wider from its proximal end side toward its free end in the longitudinal direction, the damping force becomes gradually large from the time of a collision, and the damping force can be made smooth.

Furthermore, the supported protruding rib extending in the longitudinal direction of the energy absorbing member B is formed on the main portion 7 of the energy absorbing member B, and the supporting piece 6b abutting against the supported protruding rib 10 is formed projectingly at the horizontally crushing through-hole portion 6. Hence, the energy absorbing member B can be bent with the abutting position of the supported protruding rib 10 serving as a fulcrum. In other words, when the crushable abutment portions 9 on both sides of the supported protruding rib 10 are bent, the position of the supporting piece 6b becomes the position of the fulcrum, which provides an advantage in that the bending can be effected easily.

In addition, since the shock absorbing apparatus for a steering column has weakened portions 11 formed in the main portion of the energy absorbing member in the vicinities of positions where both sides of the horizontally crushing through-hole portion 6 abut against the crushable abutment portions 9, the width of each weakened portion 11 instantaneously disappears during the occurrence of the shock. Accordingly, the interval between the crushable abutment portions 9 of the energy absorbing member B can be easily reduced, thereby allowing the action of widthwise squeezing or bending the crushable abutment portions 9 to take place smoothly.

Furthermore, as described above, the shock absorbing apparatus for a steering column is arranged such that the crushable abutment portions 9 are inclined upward and outwardly away from each other in a cross-sectional view, and the energy absorbing member B with the crushable abutment portions 9 facing upward is mounted in the horizontally crushing through-hole portion 6 formed in the downwardly inclined surface 5a of an end portion of the mounting and fixing portion 5 of the bracket A.

Accordingly, since the side wall portions of the horizontally crushing through-hole portion 6 of the bracket A diagonally abut against the crushable abutment portions 9 of the energy absorbing member B, the deformation can take place gradually, and the deformation is made stable. Hence, it is possible to prevent the biting of the energy absorbing member B by the horizontally crushing through-hole portion 6 of the bracket A.

Figure 10:
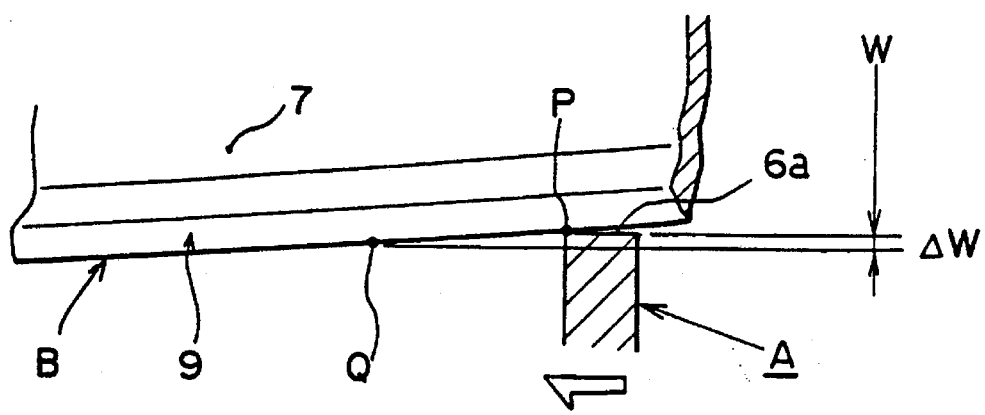
FIG. 10(a) is a plan view illustrating the state of operation in accordance with the present invention.
FIG. 10(b) is a side elevational view illustrating the state of operation in accordance with the present invention.
FIG. 10(c) is a cross-sectional view illustrating the state of operation in accordance with the present invention.
Figure 10:
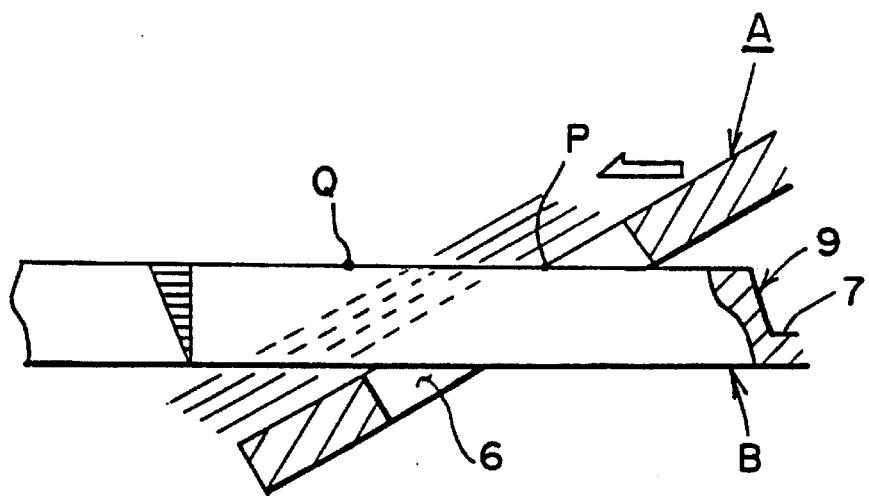
Figure 10:
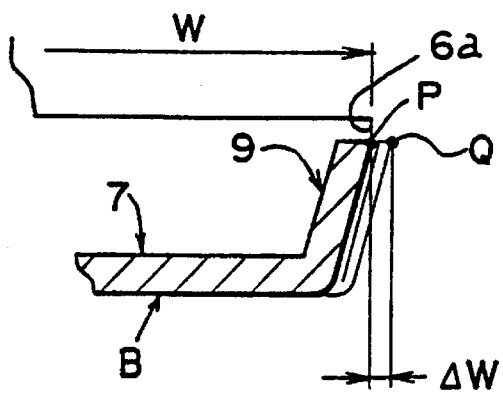

To give a more detailed description of the prevention of the biting, as shown in FIGS. 10(a), 10(b), and 10(c), in the form in which the crushable abutment portions 9 are inclined upward and outwardly away from each other in a cross-sectional view, and the crushable abutment portions 9 are disposed facing upward, the energy absorbing member B is stationary, and it is assumed that when the horizontally crushing through-hole portion 6 of the bracket A slides, deformation takes place from the position of a point P to the position of a point Q during the sliding, as shown in FIG. 10(a).

In FIGS. 10(a) and 10(c), it is an upper end of each crushable abutment portion 9 that abuts against the side wall of the horizontally crushing through-hole portion 6. Further, in FIG. 10(b) which is a side elevational view, during the displacement from the position of the point P to the position of the point Q, the horizontally crushing through-hole portion 6 of the bracket A moves in parallel in an inclined state. In this case, each crushable abutment portion 9 is reduced transversely by $\Delta W$. Then, the crushable abutment portions 9 are bent in such a manner as to be wrapped from the lower side to the upper side thereof. Thus, the deformation can take place gradually, the deformation becomes stable, and the biting of the energy absorbing member B by the horizontally crushing through-hole portion 6 of the bracket A can be prevented.

What is claimed is:

1. A shock absorbing apparatus for a steering column for absorbing a shock applied to the steering column, comprising:

an energy absorbing member which is immovably fixed to a vehicle body; and a bracket mounted on said energy absorbing member and adapted to move together with the steering column, an inclined surface being formed at an end of a mounting and fixing portion of said bracket, a crushing through-hole portion being formed in the inclined surface, and said crushing through-hole portion being capable of absorbing the shock as said crushing through-hole portion relatively moves with respect to said energy absorbing member, wherein said crushing through-hole portion includes a horizontally crushing through-hole portion including horizontally spaced opposite sides thereof and a supporting through-hole portion including vertically spaced opposite sides thereof, said energy absorbing member is provided with a main portion and a pair of crushable abutment portions formed respectively on opposite sides of said main portion, said energy absorbing member is disposed by being passed through said crushing through-hole portion, and said horizontally crushing through-hole portion normally abuts against an inclined portion of each of said crushable abutment portions in a state in which said supporting through-hole portion abuts against said main portion of said energy absorbing member, while during the occurrence of the shock said horizontally crushing through-hole portion moves while crushing said abutment portions and said supporting through-hole portion slides along said main portion.

2. A shock absorbing apparatus for a steering column according to claim 1, wherein said main portion of said energy absorbing member is formed in such a manner as to be gradually wider from a proximal end thereof toward a free end thereof.

3. A shock absorbing apparatus for a steering column according to claim 2, wherein said crushable abutment portions are formed such that a distance therebetween becomes gradually greater from the proximal end toward the free end of said main portion.

4. A shock absorbing apparatus for a steering column according to claim 2, wherein said crushable abutment portions have a region in which the distance therebetween becomes gradually greater from the proximal end toward the free end of said main portion and a region in which said crushable abutment portions are parallel with each other.

5. A shock absorbing apparatus for a steering column according to claim 1, wherein a weakened portion is formed in said main portion of said energy absorbing member in a vicinity of a position where opposite sides of said horizontally crushing through-hole portion abut against said crushable abutment portions.

6. A shock absorbing apparatus for a steering column according to claim 1, wherein said crushable abutment portions are inclined upward and outwardly away from each other in a cross-sectional view, and said energy absorbing member with said crushable abutment portions facing upward is mounted in said horizontally crushing through-hole portion formed in a downwardly inclined surface of an end portion of said mounting, and fixing portion of said bracket.

7. A shock absorbing apparatus for a steering column according to claim 1, wherein a supporting piece which has a lower end surface with a height substantially identical to that of a substantially central portion in a widthwise direction of said main portion of said energy absorbing member and slides along said main portion is formed projectingly on said supporting through-hole portion of said crushing through-hole portion.

8. A shock absorbing apparatus for a steering column according to claim 1, wherein a supported protruding rib is formed in a substantially central portion in a widthwise direction of said main portion of said energy absorbing member in such a manner as to extend in a longitudinal direction of said energy absorbing member, and a supporting member which has a lower end surface with a height substantially identical to that of said supported protruding rib and slides along an apex of said supported protruding rib, the supporting member projecting from said supporting through-hole portion of said crushing through-hole portion.

* * * * *